US007993568B2

(12) United States Patent
Heffner

(10) Patent No.: US 7,993,568 B2
(45) Date of Patent: Aug. 9, 2011

(54) PROFILED INSULATION LAN CABLES

(75) Inventor: Greg Heffner, Denver, PA (US)

(73) Assignee: Nexans, Paris (FR)

( * ) Notice: Subject to any disclaimer, the term of this patent is extended or adjusted under 35 U.S.C. 154(b) by 0 days.

(21) Appl. No.: 11/260,871

(22) Filed: Oct. 27, 2005

(65) Prior Publication Data

US 2007/0098940 A1 May 3, 2007

(51) Int. Cl.

*B29C 59/00* (2006.01)
*D01D 5/20* (2006.01)
*D01D 5/24* (2006.01)
*H01B 3/30* (2006.01)

(52) U.S. Cl. ........ 264/505; 264/506; 264/507; 264/508; 264/571; 264/167; 264/177.1; 264/209.1; 264/209.8; 425/131.1; 425/380; 425/437; 425/465; 174/110 R; 174/112; 174/113 R; 174/113 AS; 174/120 R

(58) Field of Classification Search .................. 264/514, 264/515, 572, 573
See application file for complete search history.

(56) References Cited

U.S. PATENT DOCUMENTS 3,274,315 A * 9/1966 Kawamura .................... 264/563
3,299,686 A * 1/1967 Lemieux .......................... 72/261
3,464,450 A * 9/1969 Steffenini ..................... 138/113
3,771,934 A * 11/1973 Delves-Broughton ........ 425/135
4,655,987 A * 4/1987 Zertuche ........................ 264/563
5,063,018 A * 11/1991 Fontirroche et al. ........... 264/514
5,922,155 A * 7/1999 Clouet et al. ..................... 156/51
7,163,388 B2 * 1/2007 Anand et al. ............... 425/131.1
7,238,886 B2 * 7/2007 Wiekhorst et al. ...... 174/117 AS

FOREIGN PATENT DOCUMENTS

FR 2141599 6/1971

* cited by examiner

*Primary Examiner* — Jeffrey Wollschlager
(74) *Attorney, Agent, or Firm* — Sofer & Haroun, LLP

(57) ABSTRACT

A device for making a profiled insulation having an extrusion die with an extrusion tip and a polymer chamber surrounding the extrusion tip. The polymer chamber has at least one air chamber therein. The air chamber is held in place and coupled to the outside of the extrusion die by a vertical fin extending outwards from the extrusion tip. When molten polymer flows through the polymer chamber around the air chamber, an opening is introduced into the polymer such that the profiled insulation is formed as the polymer exits the extrusion die, having a longitudinal cavity therein corresponding to the location of the opening formed by the at least one air chamber.

4 Claims, 5 Drawing Sheets

PROFILED INSULATION LAN CABLES

FIELD OF THE INVENTION

The present invention relates to insulation in cables such as LAN (Local Area Network) cables. More particularly the present invention relates to profiled insulation in cables, having a reduced effective dielectric.

BACKGROUND OF THE INVENTION

In the field of cables, such as LAN cables, certain common insulators are used for forming the twisted pair insulation as well as the outer jacket. Common polymers used include FEP (Fluorinated Ethylene Propylene) and PE (Polyethylene). Although these insulations provide good flame resistant properties needed to meet fire safety standards, such as UL riser and UL plenum ratings, they have relatively high dielectric constants, tending to cause insertion loss in the signals propagated along the cables.

One approach in the prior art for reducing the dielectric constant of an insulator is to introduce air or gas into the polymer insulation during the extrusion process in order to foam the insulation. Typically, chemical or physical foaming of the insulation (dielectric) is used to provide material reduction and an improvement to the transmission properties for data communication cables. However, there are several limitations with the foaming process.

Physical foaming of the dielectric typically includes injecting an inert gas such as nitrogen or carbon dioxide into a molten polymer under heat and pressure while inside an extruder. The gases are injected in the extruder in a low pressure area of the screw and absorbed by the molten polymer. The gas passes through the extruder, while dissolved in the molten polymer, until the polymer exits the extruder. Once the captivated gas inside the polymer is exposed to atmospheric pressures, it combines at a nucleation point and forms bubbles within the insulation. This process requires additional equipment such as a gas pressurization unit to inject the gas at a critical velocity into the polymer and complex screw designs such as multi-stage screws and an extrusion barrel with gas injection ports.

Chemical foaming is also used to create bubbles within the dielectric without the need for additional equipment. However, chemical foaming is not used as frequently as physical foaming because this method also has negative drawbacks inherent in the process. Chemical foaming is done by mixing a number of additives, at a given ratio, with the main polymer. Typically, a "nucleating agent" such as Boron Nitride is added to the main polymer to provide the point at which gas bubbles are formed and grow. The nucleating agent is distributed into the polymer with or without the use of mixing elements that are located on the extrusion screw. Increasing the amount of sites available within the polymer allows for more locations for bubbles to start. Additionally, another chemical is blended into the polymer to generate the gas. These additives, known as a "blowing agents" are mixed with the nucleating agent at the same time. The blowing agent may have a melting point much lower that the main polymer, so that once the material reaches a given temperature it degrades and produces a gas (vapor) within the melt. The vapor from the degraded material forms a bubble at the closest nucleation site. Chemical foam and gas injection extrusion lines are difficult to control and run slowly with low yields.

Another approach to reducing the dielectric constant in a conductor is to simply create cavities in the insulation surrounding the conductors. However, prior art attempts in this area are unsatisfactory, particularly with respect to insulation for each individual conductor in a twisted pair. For example, U.S. Pat. No. 5,922,155 shows an insulation provided for coaxial cables. Here, the insulator is extruded resulting in a wheel shaped insulator surrounding the central conductor of the coaxial cable. However, such a technique is not equally applicable to placing an insulator in an individual conductor from a twisted pair which is significantly smaller in diameter. Further disadvantages of the '155 patent methodology include the fact that the extrusion die used is a complicated multi-component die, requiring significant upkeep. Also, there is no ability to adjust the pressure within the cavities during extrusion without shutdown and re-tooling.

Thus, the prior art does not exhibit any means for both reducing the dielectric constant of the insulation, such as insulation on the individual copper conductors of a twisted pair communication cable, without the costly addition of materials need to foam the insulation.

OBJECTS AND SUMMARY OF THE INVENTION

The present invention looks to overcome the drawbacks associated with the prior art by providing a profiled insulation for twisted pair conductors and associated jackets and method for making the same.

To this end, the present invention is directed to device for producing profiled insulation. A device is provided for making a profiled insulation having an extrusion die. The extrusion die has an extrusion tip and a polymer chamber surrounding the extrusion tip. The polymer chamber has at least one air chamber therein. The air chamber is held in place and coupled to the outside of the extrusion die by a vertical fin extending outwards from the extrusion tip.

When molten polymer flows through the polymer chamber around said air chamber, an opening is introduced into the polymer such that the profiled insulation is formed as the polymer exits the extrusion die, having a longitudinal cavity therein corresponding to the location of the opening formed by the at least one air chamber.

Furthermore, the present invention is directed to a method for producing a profiled insulation. A method for manufacturing a profiled insulation includes providing a molten polymer formed into an insulation in a polymer chamber of an extrusion die. The extrusion die has an extrusion tip. The polymer flows around one or more air chambers in the polymer chamber and forms a profiled insulation having longitudinal cavities that correspond to the location of the air chambers.

It is another object of the present invention to provide a profiled insulation having a central opening and an outer circumference having a thickness, with at least one longitudinal cavity therein, the longitudinal cavity is substantially between 0.0025" and 0.0004."

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings:

DETAILED DESCRIPTION

In one embodiment of the present invention, as illustrated in FIGS. 1A through 1F, a profiled insulation 10 is provided. Profiled insulation generally refers to an insulator, typically for use on a conductor from a twisted pair. Unlike common solid (usually cylindrical) polymer insulation, profiled insulation 10 of the present invention has additional physical characteristics regarding its shape as discussed below.

Profiled insulation 10 is preferably constructed from a thermoplastic polymer insulation (dielectric), such as FEP (Fluorinated Ethylene-Propylene), however, any suitable polymer may be used according to any one of the desired insulation capabilities, fire resistance properties, mechanical strengths or the desired production rates of profiled insulation 10.

Each profiled insulation 10 is provided with one or more cavities 12 that extend along the longitudinal axis of insulation 10. Cavities 12 are disposed within the insulation itself and may have a circular cross-section, such as illustrated in FIGS. 1A through 1C, a trapezoidal cross-section, FIGS. 1D through 1F or possibly an elliptical shape for additional structural strength (not pictured).

Figure 2:
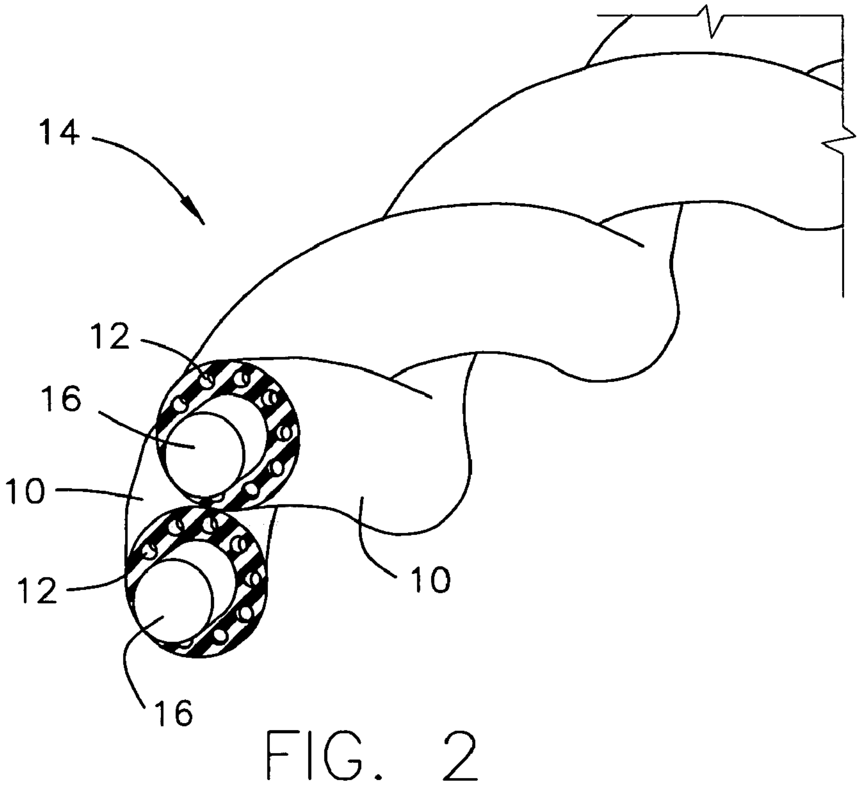
FIG. 2 illustrates an individual twisted pair conductor having the profiled insulation from FIG. 1B, in accordance with one embodiment of the present invention.

In one embodiment of the present invention, profiled insulation 10 is used as a coating for wires in twisted pairs. As illustrated in FIG. 2, a twisted pair 14 is preferably constructed of a pair of copper conductors/wires 16 twisted around one another at some regular interval. Each of the two copper wires 16 are enclosed within profiled insulation 10. It is understood that twisted pairs 14 may be constructed of any suitable metal used for twisted pairs, however copper is used to describe wire 16 for exemplary purposes. Typically one or more twisted pairs 14 are used to form a communication cable as discussed in more detail below with respect to FIGS. 3 through 5.

As noted previously, one drawback to polymer insulations on the conductors of twisted pairs is that solid FEP has a high dielectric constant, causing disruption in any signals that travel along wires/conductors 16. The present invention of profiled insulation 10 reduces the amount of FEP or other polymer used to insulate wires 16 of twisted pair 14, thus reducing the effective dielectric constant relative to solid polymer insulation. Furthermore, cavities 12 reduce the amount of FEP or other polymer used in forming profiled insulation 10, reducing the weight of profiled insulation 10 as well as the amount of polymer needed to form it relative to solid polymer insulation.

Figure 1A:
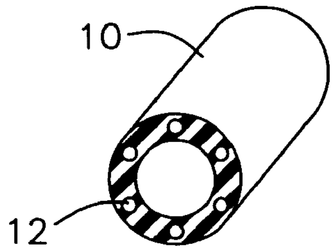
FIG. 1A through FIG. 1F illustrates profiled insulators in accordance with one embodiment of the present invention.
Figure 1B:
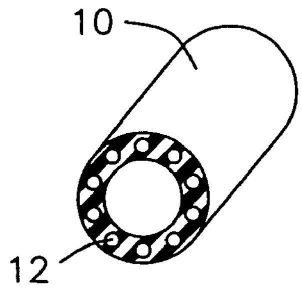
Figure 1C:
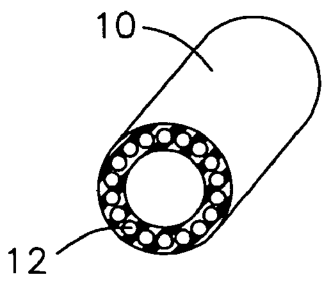

Thus, in one embodiment of the present invention, profiled insulation 10, as illustrated in FIGS. 1A through 1F, have a reduced dielectric constant relative to a solid polymer insulation of the same material. For example, a twisted pair 14 having its copper wires 16 coated with solid FEP insulation has a dielectric constant of substantially 2.095, whereas the dielectric constant of profiled insulation 10 made with FEP is substantially 1.964, as a calculated result of a reduction of substantially 15.95% in total FEP (based on 6 circular cavities 12 as shown in FIG. 1A). A tested version of the product has shown up to 27.70% reduction of FEP.

In another embodiment of the present invention, the dielectric constant of profiled insulation 10 may be further adjusted by increasing or decreasing the number of cavities 12 as shown in variations FIGS. 1B-1C. For example, additional trials have shown a reduction to a dielectric constant of substantially 1.881 and a calculated reduction of substantially 26.61% in total FEP (based on 10 circular cavities 12 as shown in FIG. 1B) with the tested version showing up to a 30.87% reduction. A reduction to a dielectric constant of substantially 1.747 and a calculated reduction of substantially 41.74% in total FEP is found based on 17 circular cavities 12 as shown in FIG. 1C.

Such arrangements may be useful for providing a reduced dielectric when variable physical strength requirements (mechanical strength) for profiled insulation 10 are allowed. Such arrangements may be useful when a very large reduction in dielectric constant is desired, but a physically strong insulation 10 is not essential, or vise versa. It is understood that the number of cavities 12 per profiled insulation 10 may be adjusted to any feasible number based on the diameter profiled insulation 10 meet the desired dielectric and weight specifications.

Figure 1D:
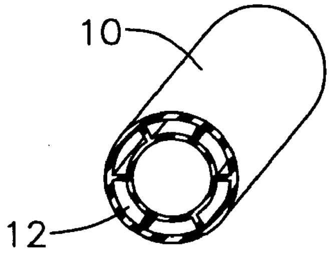
Figure 1E:
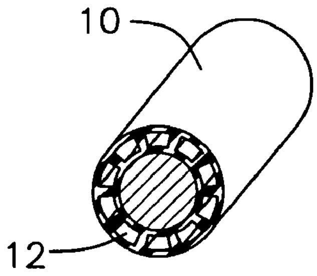
Figure 1F:
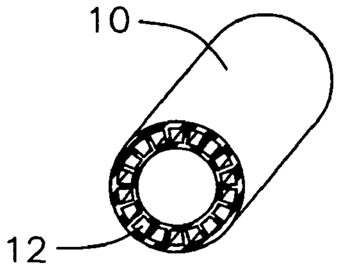

In another embodiment of the present invention, the shape of cavities 12 may be trapezoidal as shown in FIGS. 1D and 1F. For example, a reduction to a dielectric constant of substantially 1.425 and a calculated reduction of substantially 68.78% in total FEP was achieved using 6 trapazoidal cavities 12 as shown in FIG. 1D, a reduction to a dielectric constant of substantially 1.501 and a calculated reduction of substantially 63.35% in total FEP was achieved using 10 trapazoidal cavities 12 as shown in FIG. 1E and a reduction to a dielectric constant of substantially 1.572 and a calculated reduction of substantially 57.65% in total FEP was achieved using 17 trapazoidal cavities 12 as shown in FIG. 1F. The following table 1 shows the calculated and some tested results for the products shown in FIGS. 1A-1F.

TABLE 1

| | | | Standard Solid Insulation | | Gatling Die Process | | Foam Process | | Reduction in FEP | | |
|---|---|---|---|---|---|---|---|---|---|---|---|
| | Product | Hole Type | Number of Holes | Diele | Number of Holes | Diele | Foam % | Diele | Using Gatling Process | | Act. |
| Cas 1 | LAN 1000 | Circ | 0 | 2.095 | 6 | 1.964 | 10 | 1.964 | 15.95% | est | 27.70% |

TABLE 1-continued

| | | | Standard Solid Insulation | | Gatling Die Process | | Foam Process | | Reduction in FEP | | |
|---|---|---|---|---|---|---|---|---|---|---|---|
| | Product | Hole Type | Number of Holes | Diele | Number of Holes | Diele | Foam % | Diele | Using Gatling Process | | Act. |
| Cas 2 | LAN 1000 | Circ | 0 | 2.095 | 10 | 1.881 | 16.5 | 1.881 | 26.61% | est | 30.87% |
| Cas 3 | LAN 1000 | Circ | 0 | 2.095 | 17 | 1.747 | 27.25 | 1.747 | 41.74% | est | |
| Cas 4 | LAN 1000 | Trap | 0 | 2.095 | 6 | 1.425 | 55.1 | 1.425 | 68.78% | est | |
| Cas 5 | LAN 1000 | Trap | 0 | 2.095 | 12 | 1.501 | 48.2 | 1.501 | 63.35% | est | |
| Cas 6 | LAN 1000 | Trap | 0 | 2.095 | 17 | 1.572 | 42 | 1.572 | 57.65% | est | |

Such an arrangement thus results in both the reduction of the effective dielectric of insulation 10 relative to a solid FEP insulation while simultaneously significantly reducing the amount of FEP needed to produce insulation 10. Furthermore, this process is able to achieve dielectric constants comparable to foamed FEP without the need for resorting to complicated chemical or mechanical foaming processes. For example, the profiled insulation 10 of the present invention as illustrated in FIG. 1A has a comparable dielectric constant to 10% foamed FEP. Furthermore, profiled insulation 10 as illustrated in FIG. 1B has a comparable dielectric constant to 16.5% foamed FEP, profiled insulation 10 as illustrated in FIG. 1C has a comparable dielectric constant to 27.25% foamed FEP, profiled insulation 10 as illustrated in FIG. 1D has a comparable dielectric constant to 55.1% foamed FEP, profiled insulation 10 as illustrated in FIG. 1E has a comparable dielectric constant to 48.2% foamed FEP, and profiled insulation 10 as illustrated in FIG. 1F has a comparable dielectric constant to 42% foamed FEP.

Thus, according to the arrangement outlined above, a profiled insulation 10 is provided for use in insulating a conductor as small as a single copper conductor from a twisted pair. It is understood that many such variations to the number and shape of cavities 12 in profiled insulation 10 may be used based on the desired weight and desired dielectric constant.

Figure 3:
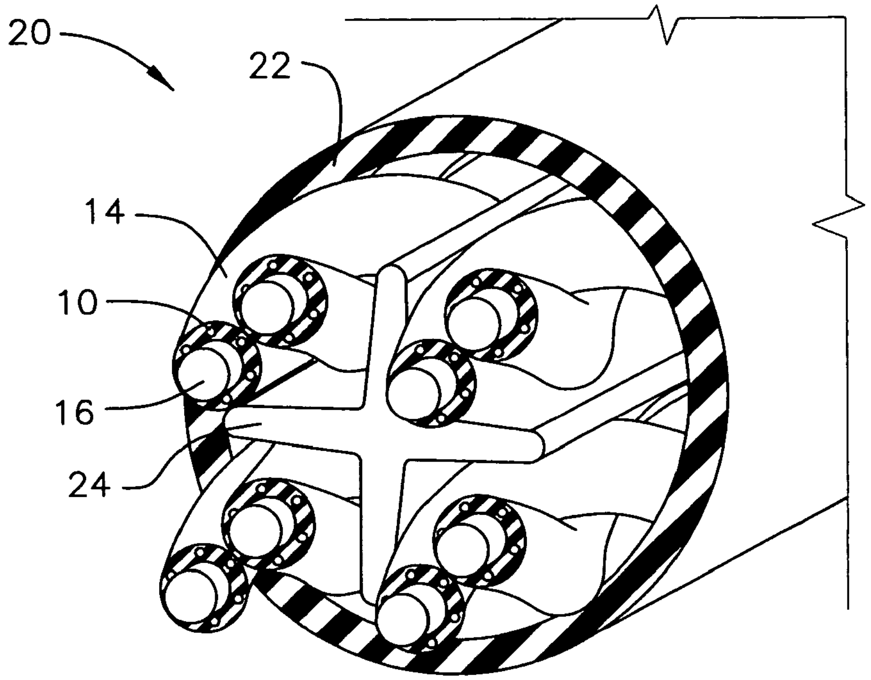
FIG. 3 illustrates a cable with a number of twisted pairs having the profiled insulation from FIGS. 1A through 1C in accordance with one embodiment of the present invention.
Figure 4:
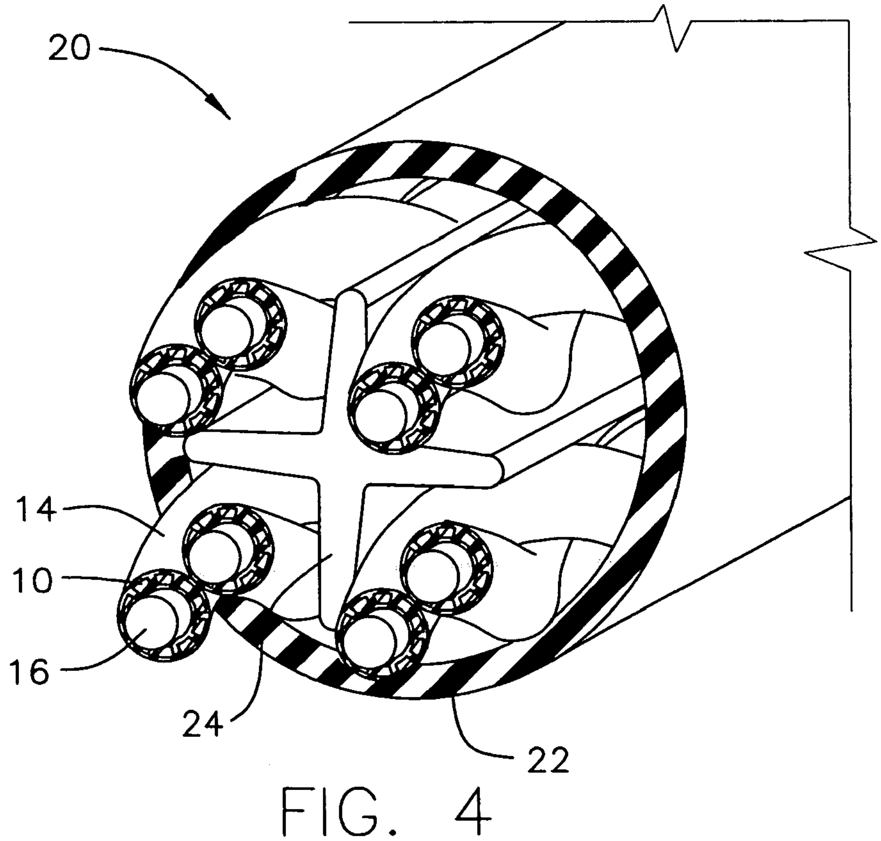
FIG. 4 illustrates a cable with a number of twisted pairs having the profiled insulation from FIGS. 1D through 1F in accordance with one embodiment of the present invention.

In another embodiment of the present invention as illustrated in FIGS. 3 and 4, a typical cable 20 is shown having four twisted pairs 14 within an outer jacket 22. Each twisted pair 14, similar to the one shown in FIG. 2, is comprised of a pair of wires 16 surrounded by a profiled insulation 10, such as the profiled insulation 10 from FIG. 1A. A cross filler element 24 is disposed within a cable jacket 22 configured to separate twisted pairs 14 from one another to reduce internal cross-talk within cable 20. FIG. 4 illustrates a similar cable 20, having a jacket 22, a cross filler 24 and four twisted pairs 14. In FIG. 4, twisted pairs 14 are formed from wires 16 surrounded by a profiled insulation 10, such as the trapezoidal profiled insulation 10 from FIG. 1E.

Figure 5:
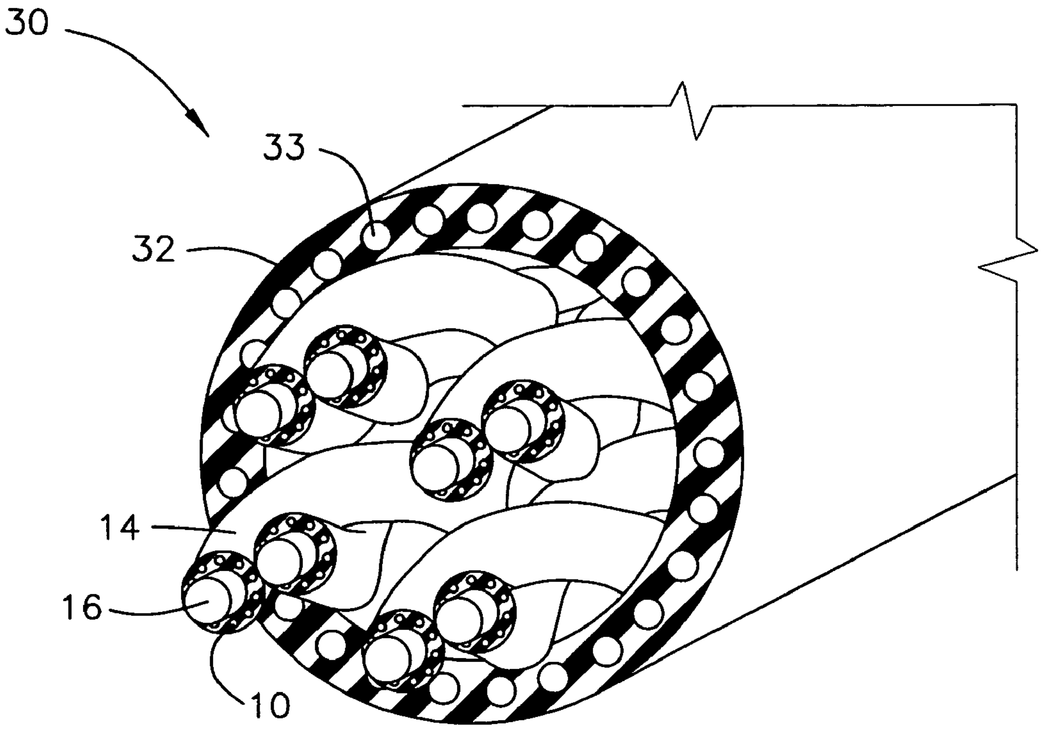
FIG. 5 illustrates a cable having a profiled jacket with a number of twisted pairs having the profiled insulation from FIGS. 1A through 1C in accordance with one embodiment of the present invention.

In another embodiment of the present invention as illustrated in FIG. 5, a cable 30 is shown, similar to cable 20 shown in FIGS. 3 and 4. Cable 30 has four twisted pairs 14 within an outer jacket 32. Each twisted pair 14, similar to the one shown in FIG. 2, is comprised of a pair of wires 16 surrounded by a profiled insulation 10, such as the profiled insulation 10 from FIG. 1B. A cross filler element (not shown) may be disposed within a cable jacket 32 configured to separate twisted pairs 14 from one another to reduce internal cross-talk with cable 30.

In this arrangement, outer jacket 32 is formed as a profiled jacket having a series of longitudinal cavities 33 running along the long axis of the jacket. This configuration of longitudinal cavities not only reduces the dielectric constant of the outer jacket, but also reduces the final weight of cable 30, lowering manufacturing costs and improving its electrical characteristics.

As discussed in more detail below the process for making jacket 32 having longitudinal cavities 33 is similar to that used to produce profiled insulation 10.

Figure 6:
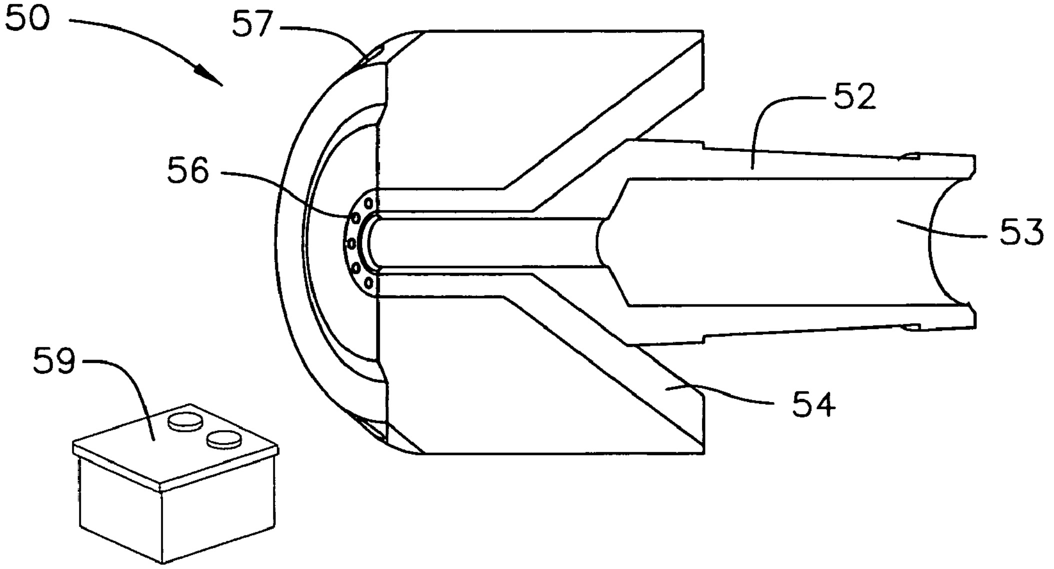
FIG. 6 illustrates an extrusion die for producing profiled cable jacket and profiled insulation for twisted pairs, in accordance with one embodiment of the present invention.

In one embodiment of the present invention, as illustrated in FIG. 6, an extrusion die 50 is provided. Extrusion die 50 is preferably constructed of a hardened metal such as nickel alloys sold under the trade names Inconel™ or Hastelloy™, either hardened or not hardened, however any suitable metal may be used. Extrusion die 50 is preferably made using a brass wire cutting technique such as brass wire erosion as well as with spark erosion however any similar effective manufacturing technique may be used.

Extrusion die 50 maintains an extrusion tip 52 through which a hollow cavity 53 runs there through. Hollow cavity 53 allows the substrate or item to be covered by the extruded insulation to pass through extrusion die 50. For the purposes of illustration, extrusion die 50 and the process for applying profiled insulation 10 is discussed in conjunction with wires 16 for forming twisted pairs 14 having profiled insulation 10. However, it is understood that a similar device and process are equally applicable for making jacket 32 with cavities 33.

Extrusion die 50 further maintains a polymer chamber 54 for guiding the molten polymer into position around wires 16 as they pass through the end of hollow cavity 53 of extrusion tip 52. As noted above, the polymer used is typically FEP, however any similar desired polymer may be passed through polymer chamber 54.

As shown in FIG. 6, within polymer chamber 54, a number of air chambers 56 are shown spaced evenly around hollow cavity 53. Air chambers 56 are generally hollow tube shaped projections that are suspended within polymer chamber 54 that correspond to the formed cavities 12 in profiled insulation 10 as explained in more detail below. Air chambers 56 preferably extend from the open end of extrusion die 10 back within polymer chamber 54 of extrusion die 50 for approximately ½" inch, but this may be extended or shortened as necessary to from cavities 12. Furthermore, air chambers 56 are preferably 0.035" in diameter for producing cavities 12 in profiled insulation 10 of a diameter between 0.003" and 0.004" as shown in FIGS. 1A-1C. Variations in the size (diameter) of cavities 12 produced by air chambers 56, may also be controlled dynamically based on air flow though chamber 56 as discussed below.

Air chambers 56 may be formed having a circular cross-section or a trapezoidal configuration resulting in cavities 12 in profiled insulation 10 as shown in FIGS. 1A-1F. Other shapes for air chambers 56 may be used to create alternatively shaped cavities 12. The shape of air chambers 56 generally corresponds ultimately to the shape of cavities 12 in profiled insulation 10.

Figure 7:
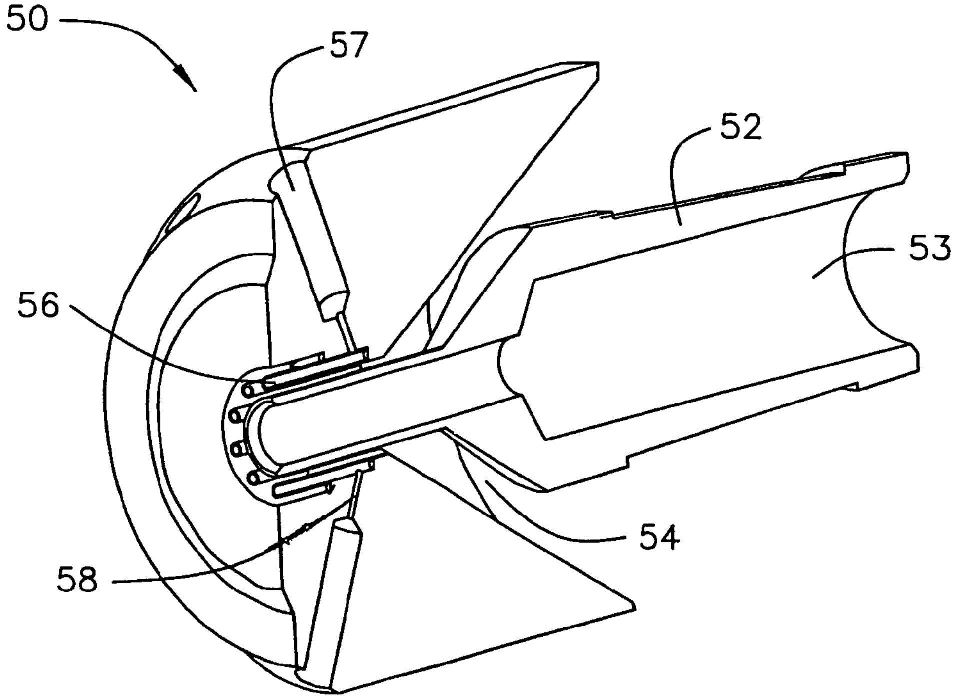
FIG. 7 illustrates a fin for supporting an air chamber within the extrusion die of FIG. 6, in accordance with one embodiment of the present invention.

As illustrated in FIG. 7, attached to the rear end of each air chamber 56 is a vertical fin 58 that extends radially inward towards the center of extrusion die 50 via air vents 57. Preferably, the diameter of fin 58 is 0.030" inches, although it is not limited in this respect. Other diameters may be used based on the desired rate of air flow from the outside of extrusion die 50 into air chambers 56. The arrangement of the present invention with thinly designed fins 58 and air chambers 56 within polymer chamber 54, allow the polymer to flow around better, resulting in a better distribution of the polymer in the resulting profiled insulation 10. Here the shape of fins 58 and air chambers 56 are such that flow and volume to air entering cavities 12 during extrusion can be carefully controlled through air vents 57.

For example, air vent 57 allows air from the outside of extrusion die 50 to enter into air chamber 56 via fins 58, allowing air to enter into polymer chamber 54 so as to maintain the stability of cavities 12 formed into profiled insulation 10. This configuration allows for ambient air pressure to be placed within the airspace of cavities 12 during the extrusion process discussed below.

In an alternative arrangement, the outlet of air vents 57 may be further coupled to a pressurizing device 59 for introducing a positive or negative air pressure into air chambers 56. Positive air pressure may be used to further support the structure of cavities 12 during extrusion. Alternatively, negative air pressure may be used to collapse cavities 12 formed by air chambers 56 in order to form a ridged profiled insulation 10 as discussed in more detail below.

Using the basic elements identified above for extrusion die 50, the following outlines the process for producing profiled insulation 10 according to the present invention.

Figure 8:
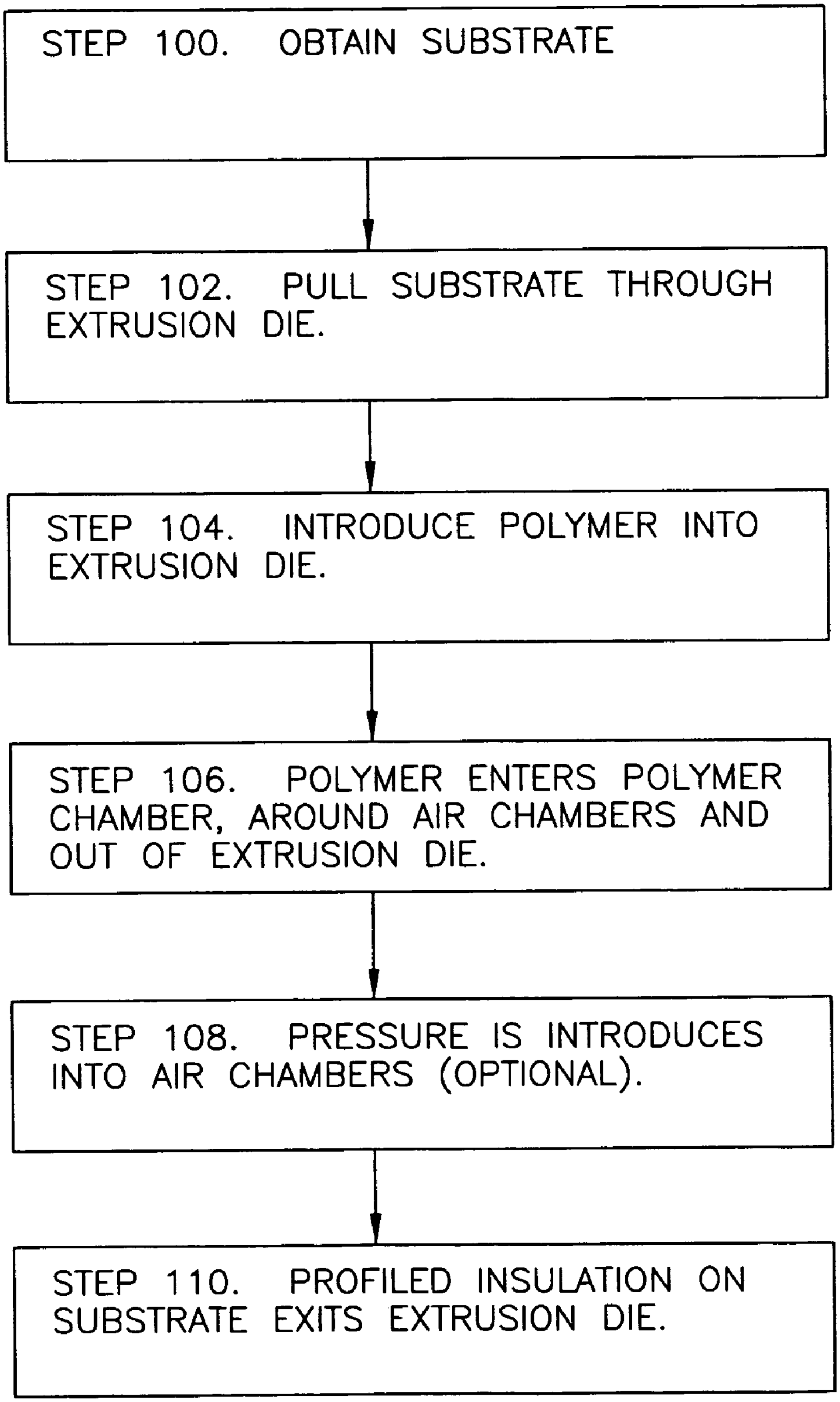
FIG. 8 is a flow chart for producing the profiled insulation from FIGS. 1A through 1F, in accordance with one embodiment of the present invention.

In one embodiment of the present invention as illustrated in FIG. 8, in a first step 100, a user first obtains a substrate on which to apply profiled insulation 10. For exemplary purposes, the substrate onto which profiled insulation 10 is placed is copper wires 16 as shown in twisted pair 14 in FIG. 2 and as discussed in detail above. A similar process may be used to form profiled jacket 32 from FIG. 5, where the substrate would be all of the internal components of cable 30.

Once the substrate, wire 16, is selected, it is fed through hollow cavity 53 of extrusion tip 52 and pulled out of the front opening of extrusion die 50 at step 102. Next, at step 104, the heated molten polymer, such as FEP is introduced into polymer chamber 54 of extrusion die 50.

At step 106, as the polymer proceeds to the front of extrusion die 50 and exits out of the front end, the polymer moves around air chambers 56 (as well as vertical fins 58) causing a corresponding number of cavities 12 to form in the polymer 12.

As an optional step 108, air pressure is introduced or removed by air-pressure device 59 via vertical fins 58 and vents 57, further increasing or decreasing air pressure within cavities 12. Alternatively, vertical fins 58 simply allow ambient air around extrusion die 50 via vents 57 to enter air chambers 50 and consequently enter cavities 12 in the polymer. When pressure is introduced via air pressure device 59, preferably either Air, Nitrogen or Helium are used, however, any useful and non-reactive gas may be used as desired.

In one embodiment of the present invention, air pressure device 59 in use, for example in creating cavities 12 in insulation 10 of FIG. 1B, a pressure of 2 psi. with the volume of Nitrogen at 728 cc/min produces 10 holes at 0.003" diameter each, at a tooling draw down ratio of 127:1 and with a calculated effective dielectric of 1.930. Changing the volume of Nitrogen to 612 cc/min at a similar pressure of 2 psi produces holes in the insulation at a 0.0025", with a tooling ratio of 127:1, yielding an effective dielectric of 1.978.

This step 108 provides a distinct advantage over the prior art. Here, by introducing variable air pressure into cavities 12 via vents 57, fins 58 and air chambers 56, the air pressure can be dynamically changed during the extrusion process thereby varying the effective dielectric constant of profiled insulation 10. This dynamic changing of air pressure by pressure device 59 during an extrusion eliminates the costly shut down and re-tooling of an extrusion apparatus, allowing the dielectric constant of the resultant profiled insulation to be adjusted/corrected on the fly.

At step 110, both wires 16 (substrate) as well as the polymer exit the front of extrusion die 50. It is noted here that tools of extrusion die 50 are larger than the finished profiled insulation 10 obtained by the process. The ratio of the size of the extrusion die openings to the size of the final profiled insulation product 10 is known as the draw down ratio. This size differential allows the molten polymer to "draw down" onto wires 16 at a distance away from the front exit of extrusion die 50. Preferably the drawn down ration DDR is 120 but may vary between 50 to 200. The DDR is a ratio of the cross-sectional area of the insulation compared to the cross-sectional area of the polymer as it exits the tooling.

This draw down process is done to conserve the integrity of cavities 12 which would not be possible in a pressure extrusion environment. Draw down of the polymer helps with achieving smaller holes in the insulation, because the die tubes can be made to a larger outside diameter than the insulation holes have to be. Assuming the gas pressure introduced at step 108 is positive or if ambient air is allowed to flow into air chamber 56 via vertical fins 58, the resulting product of this process is a wire 16 having a profiled insulation thereon such as that shown in FIGS. 1A-1F. Two such wires 16 may be formed into a desired twisted pair 14 as shown in FIG. 2 and four such twisted pairs 14 may be formed into cable 20 or 30 as shown in FIGS. 3-5.

Figure 9:
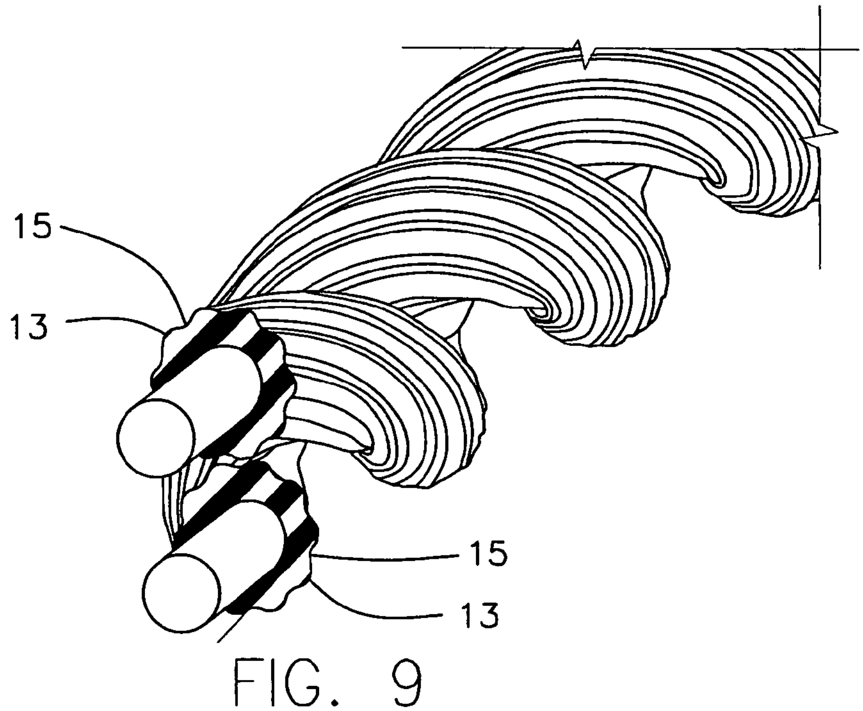
FIG. 9 illustrates a profiled insulator having collapsed cavities, in accordance with one embodiment of the present invention.

It is noted above that negative air pressure such as the choking of ambient air flow can create a vacuum as the polymer is pulled over the tube, by choking the ambient air flow off. This results in a ridged profiled insulator 10 such as that illustrated in FIG. 9 Such a ridged version of profiled insulation 10 will not exhibit cavities 12, but instead will maintain a series of peaks 13 and troughs 15 that still results in a lessened amount of polymer used for the insulation, thus having the same reduced dielectric coefficient as well as reduced weight. However the alternating peaks 13 and troughs 15 provide the ridged profiled insulation 10 with a different mechanical strength profile that may be better suited for some purposes.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A method for manufacturing an insulation by extrusion process, said method comprising the steps of:

providing a molten polymer, said polymer being formed into an insulation in a polymer chamber within an extrusion die, said extrusion die maintaining an extrusion tip therewithin, the polymer chamber being formed between an inside wall of said extrusion die and said extrusion tip;

said polymer flowing around at least one air chamber, each held in place and coupled to the outside of said extrusion die by a fin radially extending inwards from air vents formed through said die towards said extrusion tip, in said polymer chamber;

choking the air in said at least one air chamber; and forming a profiled insulation having at least one collapsed cavity extending along the full length of said insulation, that corresponds to the location of said air chamber.

2. The method as claimed in claim 1, wherein the step of said polymer flowing with in said polymer chamber includes flowing around a plurality of air chambers, resulting in a plurality of collapsed cavities along the length of said insulation that correspond to the locations of said plurality of air chambers.

3. The method as claimed in claim 1, further comprising the step of employing a plurality of air chambers, wherein said step of forming a profiled insulation includes forming a profiled insulation having a series of peaks and troughs around the circumference of said insulation, said troughs corresponding to the location of said plurality of air chambers.

4. The method as claimed in claim 2, wherein said plurality of collapsed cavities along the length of said insulation corresponding to said locations of said plurality of air chambers form a series of peaks and troughs around the circumference of said insulation.

* * * * *